Patented Sept. 6, 1927.

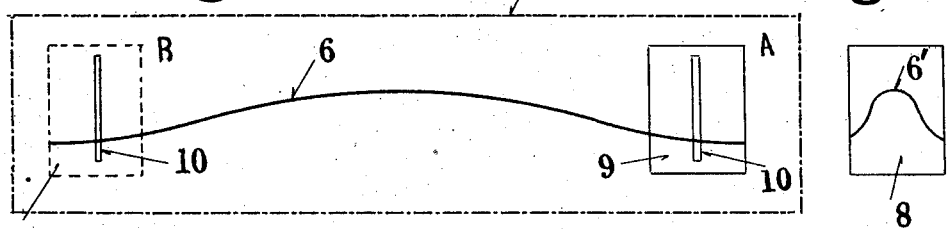
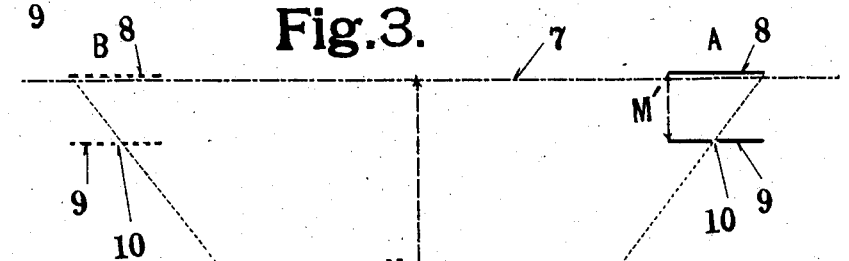
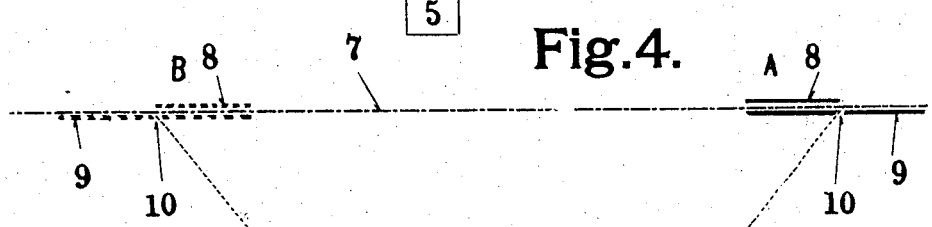

1,641,184

UNITED STATES PATENT OFFICE.

JOHN K. McNEELY, OF ST. LOUIS, MISSOURI.

METHOD OF PRODUCING ANAMORPHOUS IMAGES.

Application filed May 5, 1924. Serial No. 711,095.

My invention relates to a method of producing anamorphous images and is particularly applicable to making photographic records of the deflection under stress of railway rails, beams or other objects in which the length is very great relative to the deflection. Under such condition it is necessary, in order to secure practically useful graphic representations of the deflection, to reduce the length of the image while maintaining the full lateral deflection or even enlarging the latter, it being essential to maintain a predetermined ratio of distortion in the image.

It has heretofore been proposed to secure results similar to those accomplished by my method either through the use of prisms to distort the image or by moving the normal image and a sensitized surface both relative to a fixed shield having a slot therein, the amount of distortion in the latter instance being determined by the relative speed of travel existing between the normal image and the sensitized surface. The first of these methods introduces optical, and the second mechanical difficulties which it is the object of the present invention to overcome.

In carrying out my invention I employ a fixed normal image and move across the field of the same a slotted shield and a sensitized surface; these parts, in my preferred method, being relatively fixed so that the amount of distortion will depend only upon the ratio between the distance from the projector to the sensitized surface and that from the shield to said surface.

In the accompanying diagrammatic drawings Figure 1 is an elevation of apparatus for carrying out my preferred method; Figure 2 illustrates the resultant distorted image; Figure 3 is a plan view of the apparatus shown in Figure 1; and Figure 4 is a plan view of apparatus for carrying out a modification of my method.

Referring first to Figures 1, 2 and 3, 5 indicates a projector by means of which the normal image 6 is thrown upon a plane 7, hereinafter referred to as the plane of projection. The projector 5 is situated at a distance M from the plane of projection and is fixed relatively thereto. 8 is a sensitized surface, such as a photographic plate, which, together with a shield 9, having therein a vertical slot 10 is moved across the plane of projection in a direction perpendicular to the slot 10 from the right hand position A to the left hand position B, or vice versa. The shield 9 is arranged at a distance M' from the plate 8 and is fixed relatively thereto so as to move in unison therewith. When the movement is completed it is evident that the plate will have formed thereon an anamorphous image 6' (Figure 2) the height of which is the same as that of the normal image but the length of which will bear the same ratio to the length of the normal image as the distance M' bears to the distance M. It will be evident that the amount of distortion will depend entirely upon the ratio of M to M' and not upon the speed of travel which should, however, be substantially uniform to ensure equal strength of impression throughout the length of the image.

In Figure 4 I have shown apparatus for carrying out a modification of my method. In this modification the shield 9 is placed as close to the plate 8 as mechanically practicable. The slot 10 at the beginning of the movement registers with one edge of the plate and the plate and shield are moved across the plane of projection, as hereinbefore set forth, except that in this case the plate and shield do not move in unison, but, on the contrary, the shield moves at a speed slightly greater or less than the plate. It will be evident that in this method the length of the anamorphous image will depend upon the difference in the amount of travel of the plate and shield. In the drawing I have illustrated the shutter as travelling a distance A—B plus the width of the plate 8 while the plate travels the distance A—B, thus utilizing the entire width of the plate for the anamorphous image.

Having fully described my invention, what I claim as new and desire to secure by Letters Patent of the United States is:

1. The method of producing an anamorphous image which comprises projecting an enlargement of a fixed image upon a distant plane and moving a sensitized surface and a slotted shield across said plane in a direction substantially perpendicular to the slot in said shield, the shield being arranged between the fixed image and the sensitized surface and producing a progressive movement of the projected enlarged image across substantially the entire width of the sensitized surface.

2. The method of producing an anamorphous image which comprises projecting an enlargement of a fixed image upon a distant plane and moving a sensitized surface and a slotted shield in unison across said plane in a direction substantially perpendicular to the slot in said shield, the shield being arranged between the fixed image and the sensitized surface and producing a progressive movement of the projected enlarged image across substantially the entire width of the sensitized surface.

3. The method of producing an anamorphous image which comprises projecting an enlargement of a fixed image upon a plane and moving a sensitized surface and a slotted shield spaced therefrom in unison across said plane in a direction substantially perpendicular to the slot in said shield, the shield being arranged between the fixed image and the sensitized surface.

In testimony whereof, I have hereunto set my hand this the 2nd day of May, 1924.

JOHN K. McNEELY.